Dec. 21, 1965  J. MAGGIORE  3,224,715
DOOR-MOUNTING FOR A MIRROR
Filed Jan. 20, 1964
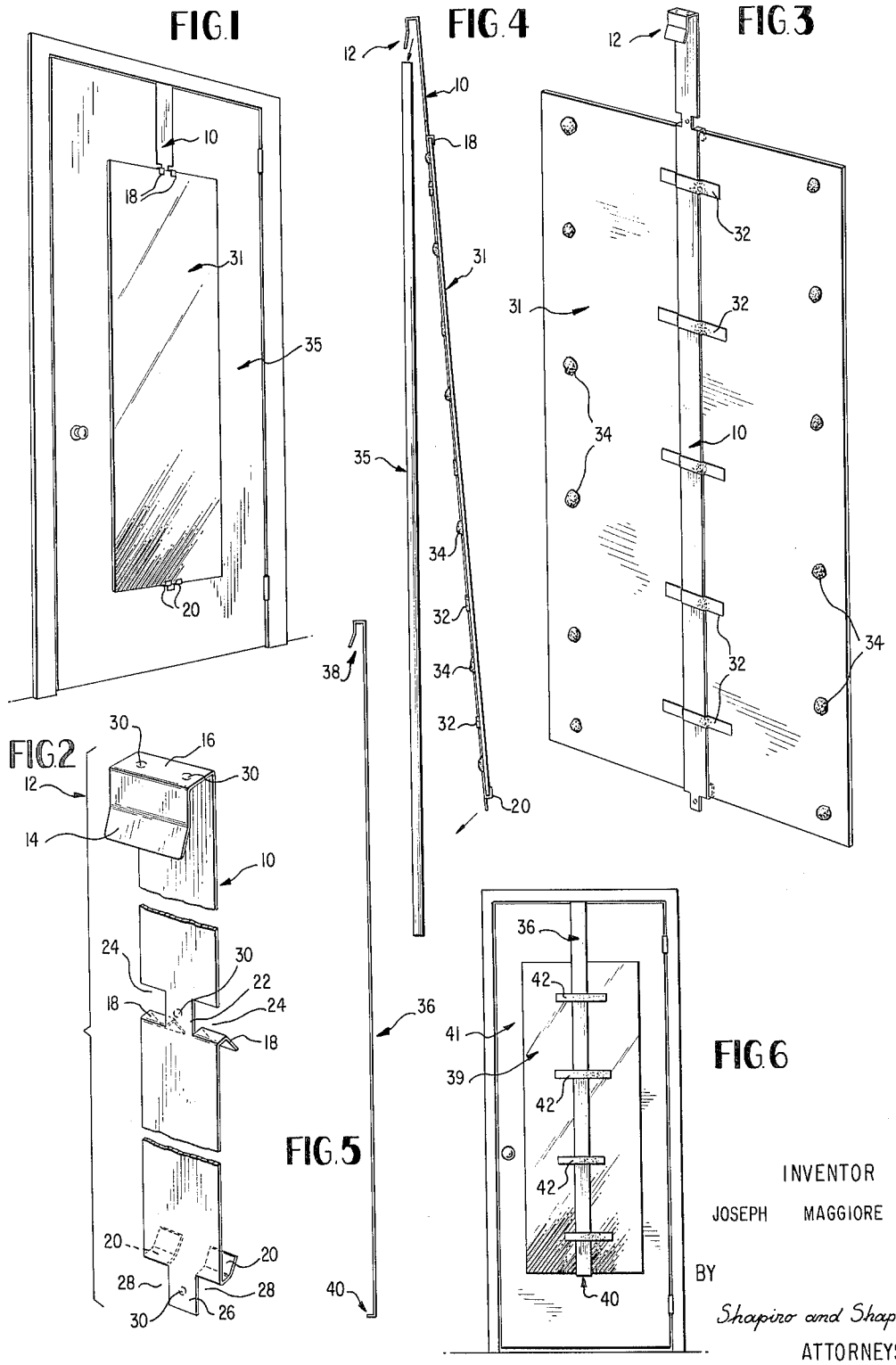
INVENTOR
JOSEPH MAGGIORE
BY
Shapiro and Shapiro
ATTORNEYS

# United States Patent Office 3,224,715
Patented Dec. 21, 1965

3,224,715
DOOR-MOUNTING FOR A MIRROR
Joseph Maggiore, 8300 Mona Ave., Norfolk, Va.
Filed Jan. 20, 1964, Ser. No. 339,016
11 Claims. (Cl. 248—29)

This invention relates to door-mounting for mirrors, and more particularly to devices and methods for supporting or facilitating the mounting of mirrors upon doors.

Doors have been widely used to support mirrors in bedrooms or bathrooms, for example, because they provide convenient available space, because they may be removed to facilitate mounting of the mirror, and because they avoid the problem of placing wall anchors in plaster walls. The mirrors usually employed are of thick plate glass, frequently "full length," and are usually heavy, weighing twenty-five, thirty pounds or more. The mounting of a large mirror upon a door is often a two-man operation, it being common practice for one person to hold the mirror in position upon the door while another secures mounting brackets to the door by means of screws. To facilitate mounting of the mirror it is often recommended that the door be removed from its hinges and placed in a horizontal position while the mirror is located on and mounted upon the door. While this procedure alleviates the problem of supporting the weight of the mirror during mounting, there remains the cumbersome task of removing the door and then replacing the door with the added weight of the mirror.

The screw-type brackets commonly employed in the mounting of mirrors upon doors must be carefully applied, because too much screw pressure may crack the mirror, particularly if the door is warped or uneven. Hollow-core and recessed panel doors create special problems when attempts are made to mount mirrors of different size by the use of screw-type brackets. Moreover, lease restrictions frequently prohibit the drilling of holes in doors. Even in the absence of such restrictions householders are reluctant to deface a door by the drilling of holes. If the mirror is ever removed or transferred to a different door, the remaining holes are unsightly.

It has heretofore been proposed to mount garment hangers and similar items upon doors by the use of a hook which fits over the top edge of the door. Indeed, it has been proposed to mount a mirror upon a door by means of an elaborate assemblage of vertical and horizontal rods, brackets, hooks, nuts, and bolts which are ultimately supported by the top and bottom edges of the door. However, it has not heretofore been possible to mount a mirror upon a door in a simple, economical, efficient, and expeditious manner. It is accordingly a principal object of the invention to provide for such mounting.

Another object of the invention is to provide a mirror hanger which is formed from a single piece of material, which is sturdy yet lightweight, which requires no drilling of holes, which is neat in appearance, and which may readily be made so as to accommodate different types of doors and different types of mirrors.

Another object of the invention is to provide a mirror hanger which permits a housewife to remove a mirror from its shipping carton and to mount the mirror upon a door in less than a minute.

Still another object of the invention is to provide a mirror hanger which avoids the need for removal of the door from its hinges.

An additional object of the invention is to provide a mirror hanger which may be utilized with all of the standard door mirrors regardless of their width.

A still further object of the invention is to provide a mirror hanger which permits the mirror to be removed from the door almost instantly, without leaving the door defaced, and which permits the ready transfer of a mirror from one door to another.

A still further object of the invention is to provide a mirror hanger which actually utilizes the weight of the mirror to ensure proper operation of the hanger while promoting economy of hanger construction.

An additional object of the invention is to provide for the hanging of a mirror upon a door with an air space between the back of the mirror and the opposing surface of the door, so as to avoid condensation problems in bathrooms, for example.

It is also an object of the invention to provide methods of mounting mirrors upon doors or the like in accordance with the foregoing purposes of the invention.

Yet another object of the invention is to provide a device for facilitating the mounting of a mirror upon a door when it is desired to utilize screw-type or other conventional mounting brackets.

Still another object of the invention is to provide a method for facilitating the mounting of a mirror by means of screw-type or other conventional brackets.

Briefly stated, and without intent to limit its scope, the present invention in one embodiment utilizes an elongated, unitary flat strip formed with a hook at its top adapted to fit over the top edge of a door and having tabs located to engage the top and bottom edges of the mirror when the strip is placed longitudinally and centrally at the back of the mirror. Pressure-sensitive adhesive is employed to secure the back of the mirror to the opposing surface of the door, and adhesive-faced tapes are preferably employed to enhance the attachment of the strip to the back of the mirror. In another embodiment an elongated flat strip having the same type of hook at the top is provided with a tab or shelf extending toward the door, so that a mirror may be supported upon the shelf with the strip at the front of the mirror, while conventional screw-type brackets are located upon and secured to the door.

The foregoing and other objects, advantages, and features of the invention, and the manner in which the same are accomplished will become more readily apparent upon consideration of the following detailed description of the invention, taken in conjunction with the accompanying drawing, which illustrates preferred and exemplary embodiments of the invention, and wherein:

FIGURE 1 is a perspective view illustrating a mirror mounted upon a door in accordance with the invention;

FIGURE 2 is a contracted perspective view illustrating a preferred form of mirror hanger in accordance with the invention;

FIGURE 3 is a perspective view illustrating the manner in which the hanger is applied to the mirror and illustrating the use of adhesive for attaching the mirror to the door and attaching the hanger to the mirror;

FIGURE 4 is a side elevation view illustrating the manner in which the mirror and hanger are applied to the door;

FIGURE 5 is a side elevation view of a jig device which may be employed to support a mirror in order to facilitate the mounting of the mirror upon a door by means of conventional hangers; and FIGURE 6 is a front elevation view illustrating a mirror supported upon the door by means of the jig of FIGURE 5.

Referring to the drawing, and initially to FIGURE 2 thereof, reference numeral 10 designates a preferred mirror hanger in accordance with the invention, which in the form shown is constituted by a single, continuous, elongated flat strip, preferably of somewhat flexible sheet metal, such as steel of the order of eighteen to twenty-two gauge in thickness. The top of the strip is formed with a rectangular hook 12 adapted to fit over the top edge of a door. The lowermost portion 14 of the hook may diverge slightly, as shown, to facilitate placement of the hook over the door with the hanger diverging from the door. The top 16 of the hook is made wide enough to accommodate a conventional door with which the device is to be used. The thickness of the strip material, and hence its flexibility, must be chosen so that the hook is sufficiently rigid to avoid deformation under the mirror load and yet is thin enough to fit over the top of the door without creating clearance problems with respect to the cap of the door frame. The use of relatively thin material is economical, and as will appear hereinafter, the weight of the mirror tends to pull the strip taut. The strip need not be unduly wide, typically being of the order of two inches wide, but should be wide enough for lateral stability of the mirror. The length of the strip is determined by the height of the mirror to be employed therewith. Typically the overall length of the strip may be about seventy-four inches for use with a mirror having a height of sixty inches.

At locations corresponding to the top and bottom edges of the mirror the hanger strip is formed with tabs 18 and 20, which may be struck from the material of the strip by conventional punching and bending techniques. At least the upper tabs 18 are preferably formed as a pair of tabs at opposite sides of a central bar 22 defined by notches 24, which result from the formation of the tabs. In the form shown the lower tabs 20 are similarly formed as a pair of tabs on opposite sides of a central bar 26 defined by notches 28. The tabs extend laterally from the strip in a direction opposite to the top 16 of the hook 12 and extend downwardly or upwardly to embrace the corresponding edges of the mirror. The strip may be provided with knock-outs 30 at the top 16 of the hook, at bar 22, and at bar 26, so that the strip may be screwed to a door if desired, but in accordance with the preferred embodiment of the invention these knock-outs are not employed, because no screws are necessary. If it is not desired to provide a knock-out at the bottom of the strip, tabs 20 may be formed as a single tab extending the full width of the strip, and bar 26 may be eliminated.

In the condition shown in FIGURE 2, the downwardly and upwardly turned ends of the tabs are not parallel to the strip, so that a mirror may be slipped edge-wise between the opposed tabs, and then the tabs may be pressed down against the front face of the mirror to secure the hanger thereto. While this may be done just prior to installation of the mirror, it is preferred that the hanger be assembled with the mirror prior to sale to the consumer, so that the consumer may remove the mirror from its shipping carton with the hanger already attached to the mirror, thereby greatly reducing the time and effort required to mount the mirror. The lateral excursion of the tabs depends upon the thickness of the mirror to be employed therewith. A mirror of any reasonable width may be employed with a hanger of the type shown, the width of the mirror being independent of the width of the hanger.

FIGURE 3 illustrates the placement of the hanger upon a mirror 31. The hanger is located longitudinally and centrally of the mirror at its back. While the weight of the mirror tends to pull the hanger strip taut, the strip may be secured to the back of the mirror at spaced locations along its length by the use of pieces of inexpensive adhesive-faced tape 32 placed transversely over the back of the strip and secured to the strip and to the laterally adjacent portions of the mirror back. Any suitable tape, such as pressure-sensitive cellophane or masking tape may be employed for this purpose.

To avoid the need for screws and yet to ensure that the mirror is held tightly against the door, the present invention utilizes pressure-sensitive adhesive between the back of the mirror and the opposing surface of the door. Such adhesive preferably takes the form of a permanently pliable, permanently tacky adhesive material, such as the all-purpose weatherstrip sold under the trademark "Mortite" by the Mortell Company of Kankakee, Illinois. Small masses of such material may be placed upon the back of the mirror as shown at 34, the spaced locations of the adhesive being selected to ensure firm adherence of the mirror to the door. The location of the masses of adhesive 34 should be preselected to accommodate recessed panel doors, but additional adhesive material may be provided in the shipping carton for special situations. To protect the adhesive during shipping, loops of masking tape or the like (not shown) may be placed over the adhesive protuberances.

To install the mirror upon a door 35, the protective coverings are removed from the masses of adhesive 34, and additional masses of adhesive are placed upon the back of the mirror if required by the configuration of the door panels. The top of the hanger is then hooked over the top edge of the open door as shown in FIGURE 4, the back of the mirror being held divergently away from the door until the desired lateral and vertical position of the mirror on the door is ensured. The divergence of the bottom of the hook and the flexibility of the hanger permit ease of engagement of the hook over the door even with the mirror held away from the door. Then the door is closed and the mirror is pressed tightly against the door, pressure being exerted over each of the adhesive areas to ensure firm attachment to the door surface. The mounted mirror appears as in FIGURE 1, wherein it is seen that the length of the hanger strip between the hook and the upper tabs is predetermined for proper vertical placement of the mirror on the door. Screws may be inserted in the places provided by the knock-outs 30, but a mirror hung in accordance with the invention is securely and firmly held without screws. Repeated slamming of the door will not loosen the mirror. If vertical displacement of the mirror is likely, because of the activities of chlidren, for example, screws may be placed through the top 16 of the hook 12, where there is no problem of screw retention or visible defacement.

From the foregoing description it is apparent that a mirror can be mounted simply and expeditiously in accordance with the invention. Even relatively heavy door mirrors can be mounted by a housewife. Moreover, the mirror may be removed or transferred to another door simply by grasping the edges of the mirror adjacent its bottom and pulling the mirror progressively away from the door so as to flex the hanger, finally lifting the hook from the top of the door and placing it upon the top of another door. Most of the adhesive material 34 will adhere to the back of the mirror when the mirror is removed, but any remaining traces may be removed by light application of a solvent such as lighter fluid.

The simplicity of the mirror hanger of the invention makes economically feasible the provision of a hanger which may be secured to the mirror by the manufacturer. The use of the adhesive masses 34 has an additional advantage in that a slight air space is provided between the mirror and the door, thereby to obviate condensation problems in bathrooms, for example. The neatness of the appearance of the mirror hanger is evident from its minimal exposure to view.

FIGURES 5 and 6 illustrate a different concept, wherein a mirror hanger is employed as a jig to facilitate the attachment of a mirror to a door by conventional means. Jig 36 is a flat strip of material, preferably somewhat flexible sheet metal, formed with a hook 38 at the top and a shelf or tab 40 at the bottom. It will be noted that the shelf extends laterally from the strip in the same direction as the top of the hook, that is, toward the door in use. To employ the jig of the invention, the mirror 39 is placed face up on a horizontal surface, and the jig is placed longitudinally and centrally against the front face of the mirror, with the shelf 40 extending under the lower edge of the mirror. Strips 42 of adhesive-faced material, such as masking tape, are then placed across the jig so as to adhere to the jig and the laterally adjacent regions of the mirror surface. The mirror with the jig attached is then lifted, and the hook 38 is placed over the top edge of the open door 41. The door may then be closed to stabilise the mirror during the attachment process which follows. This process may include the locating and fixing of the usual screw-type mirror brackets at the top, bottom, and side edges of the mirror. After the mirror is securely fastened to the door, strips 42 are peeled off, shelf 40 is withdrawn from the bottom edge of the mirror, and the hook 38 is lifted from the top edge of the open door. It is apparent that by the employment of the jig 36 and the corresponding method of supporting the mirror during mounting, a housewife may mount a mirror upon a door without assistance.

While preferred embodiments of the invention have been shown and described, it will be apparent to those skilled in the art that changes can be made in these embodiments without departing from the principles and spirit of the invention, the scope of which is defined in the appended claims. Accordingly, the foregoing embodiments are to be considered illustrative, rather than restrictive of the invention, and those modifications which come within the meaning and range of equivalency of the claims are to be included therein.

The invention claimed is:

1. The method of supporting a mirror upon a door, comprising placing against the back of the mirror a flat strip having a hook at the top end and having spaced tabs, engaging said tabs over the top and bottom edges of the mirror, placing adhesive between the back of the mirror and the opposing surface of the door, placing said hook over the top of said door, and pressing said adhesive between the mirror and the door.

2. The method of claim 1, in which said strip is also attached to said mirror by means of adhesive placed at locations along said strip.

3. The method of claim 1, wherein said strip is flexible and said hook has a divergent entrance, said hook being placed over said door with said strip flexed away from the side of the door.

4. In the method of mounting a mirror upon a door by means of an elongated strip jig having a hook at the top and a shelf at the bottom extending laterally in the same direction as the hook, the steps of supporting the bottom edge of said mirror upon said shelf, with the strip extending along the front mirror face, hanging said hook over the top edge of said door, affixing said mirror to said door by means independent of said jig, and removing said jig by withdrawing the shelf from the bottom edge of said mirror and then the hook from the top edge of the door.

5. The method of claim 4, said strip being temporarily attached to said mirror by applying removable pressure-sensitive adhesive before said mirror and said jig are hung upon said door.

6. In combination with a mirror to be hung upon a vertical surface, a flat, wide strip extending vertically and centrally along the back of said mirror, said strip having tabs engaging the top and bottom edges of the mirror, and having means for suspending it upon said vertical surface, and a plurality of masses of pressure-sensitive permanently tacky adhesive at spaced locations on the back of said mirror for holding said mirror against said surface.

7. The combination of claim 6, wherein said strip is flexible sheet metal having a length of the order of several feet, a width of the order of two inches, and a thickness of the order of eighteen to twenty-two gauge, said means for suspending said strip comprising a divergent-entrance, rectangular hook at the top of said strip and adapted to fit over the top of a door.

8. The combination of claim 7, further comprising a plurality of pieces of adhesive-faced tape extending across said strip at spaced locations along its length and adhered to the back of said mirror at opposite sides of the strip.

9. A method of hanging a mirror upon a vertical surface, which comprises supporting the weight of the mirror upon a flat, wide, vertical strip located centrally on the back of the mirror, having tabs engaged over the top and bottom edges of the mirror, and suspended upon said surface, and securing the mirror against the surface by placing a plurality of masses of pressure-sensitive, permanently tacky adhesive material at spaced locations between the back of the mirror and said surface.

10. A method of hanging a mirror upon a vertical surface, which comprises placing a flat, wide strip along the back of the mirror with the strip extending vertically and centrally of the mirror, engaging tabs of the strip about the top and bottom edges of the mirror, suspending the strip upon said surface to support the weight of the mirror, and interposing a plurality of masses of pressure-sensitive, permanently tacky adhesive material between the back of said mirror and said surface at spaced locations in order to maintain said mirror against said surface.

11. A method of hanging a mirror upon a vertical surface, which comprises placing a flat, flexible, wide, strip upon the back of said mirror with the strip extending vertically and centrally of said mirror, engaging tabs of said strip about the top and bottom edges of said mirror, placing a plurality of pieces of adhesive-faced tape across said strip at spaced locations along its length, suspending said strip upon said surface, and securing said mirror against said surface with a plurality of masses of pressure-sensitive, permanently tacky adhesive at spaced locations between the back of said mirror and said surface.

References Cited by the Examiner

UNITED STATES PATENTS

| 881,661 | 3/1908 | Burnard | 248—28 |
|---|---|---|---|
| 1,196,332 | 8/1916 | Cabell | 40—124 |
| 1,357,280 | 11/1920 | Dulle | 248—28 |
| 1,495,485 | 5/1924 | Jersemann | 248—301 |
| 2,723,815 | 11/1955 | Browning | 248—29 |

FOREIGN PATENTS

| 654,890 | 7/1951 | Great Britain. |
|---|---|---|
| 730,826 | 6/1955 | Great Britain. |

CLAUDE A. LE ROY, *Primary Examiner.*

J. F. FOSS, *Assistant Examiner.*